(12) United States Patent
Thillainadarajah et al.

(10) Patent No.: US 10,883,827 B2
(45) Date of Patent: Jan. 5, 2021

(54) PACKAGING DEVICE FOR MEASURING MOTION IN MANUFACTURE

(71) Applicant: Smart Skin Technologies Inc., Fredericton (CA)

(72) Inventors: Kumaran Thillainadarajah, Fredericton (CA); Adam Joseph MacDonald, Hanwell (CA); Roua M. Razak, Fredericton (CA)

(73) Assignee: Smart Skin Technologies Inc., Fredericton (CA)

( * ) Notice: Subject to any disclaimer, the term of this patent is extended or adjusted under 35 U.S.C. 154(b) by 127 days.

(21) Appl. No.: 15/846,902

(22) Filed: Dec. 19, 2017

(65) Prior Publication Data
US 2018/0172444 A1 Jun. 21, 2018

Related U.S. Application Data

(60) Provisional application No. 62/436,682, filed on Dec. 20, 2016.

(51) Int. Cl.
*G01C 19/00* (2013.01)
*G01P 15/00* (2006.01)
*G01C 1/00* (2006.01)

(52) U.S. Cl.
CPC ............... *G01C 19/00* (2013.01); *G01C 1/00* (2013.01); *G01P 15/00* (2013.01)

(58) Field of Classification Search
CPC ............ G01C 19/00; G01C 1/00; G01P 15/00
(Continued)

(56) References Cited

U.S. PATENT DOCUMENTS 4,531,995 A * 7/1985 Gau ..................... B65C 9/045
156/456
4,989,462 A 2/1991 Davis et al.
(Continued)

FOREIGN PATENT DOCUMENTS

CN 102589759 A 7/2012
EP 0087264 A3 7/1984
(Continued)

OTHER PUBLICATIONS

International Search Report and Written Opinion dated Mar. 20, 2018 in corresponding International Patent Application No. PCT/CA2017/051542.
(Continued)

*Primary Examiner* — Tarun Sinha
(74) *Attorney, Agent, or Firm* — Bereskin & Parr LLP; Isis E. Caulder; Reshika Dhir

(57) ABSTRACT

A system and method of measuring and analyzing an object within a rotating shell is provided. The system can include a receptacle defining an interior storage chamber; at least one sensor, the at least one sensor being contained within the interior storage chamber, the at least one sensor having a fixed spatial relationship to the receptacle; and at least one processor configured for processing the measurement data. The at least one sensor can include a gyroscope for measuring angular velocity of the receptacle over a duration of time and generating measurement data indicative of the angular velocity over the duration of time. In some embodiments, the method involves determining a position of the receptacle within the rotating shell. In some embodiments, the receptacle includes heat resistant material capable of shielding electronics contained within the interior storage chamber from temperatures that exceed a maximum temperature rating of the electronics.

20 Claims, 13 Drawing Sheets

(58) Field of Classification Search
USPC .................................................. 73/504.03
See application file for complete search history.

(56) References Cited

U.S. PATENT DOCUMENTS

| | | | |
|---|---|---|---|
| 5,054,323 | A | 10/1991 | Hubbard, Jr. et al. |
| 5,079,949 | A | 1/1992 | Tamori |
| 5,439,217 | A | 8/1995 | Ganger, Sr. |
| 5,499,526 | A | 3/1996 | Muro |
| 5,644,078 | A * | 7/1997 | Ahdoot .................. G01C 19/00 73/178 R |
| 6,033,370 | A | 3/2000 | Reinbold et al. |
| 6,125,686 | A | 10/2000 | Haan et al. |
| 6,716,034 | B2 | 4/2004 | Casanova, Jr. et al. |
| 7,174,277 | B2 | 2/2007 | Vock et al. |
| 7,219,033 | B2 | 5/2007 | Kolen |
| 7,401,525 | B2 | 7/2008 | Cobianu et al. |
| 7,726,197 | B2 | 6/2010 | Selvan et al. |
| 8,033,916 | B2 | 10/2011 | Caldwell et al. |
| 2009/0256817 | A1 | 10/2009 | Perlin et al. |
| 2011/0096025 | A1 | 4/2011 | Slobodin et al. |
| 2011/0260994 | A1 | 10/2011 | Saynac et al. |
| 2012/0055257 | A1 | 3/2012 | Shaw-Klein |
| 2014/0366650 | A1 | 12/2014 | Thillainadarajah et al. |
| 2015/0130762 | A1 | 5/2015 | Wang |
| 2016/0290809 | A1 | 10/2016 | Eline et al. |
| 2016/0327396 | A1 | 11/2016 | Hallberg |

FOREIGN PATENT DOCUMENTS

| | | |
|---|---|---|
| JP | S55-125429 A | 9/1980 |
| WO | 97/18450 A1 | 5/1997 |
| WO | 2010/122996 A1 | 10/2010 |
| WO | 2015/126678 A1 | 8/2015 |

OTHER PUBLICATIONS

McMaster-Carr, "Ultem PEI Sheets and Bars", article accessed Nov. 21, 2016 <https://www.mcmaster.com/#ultem/=otzvqt>.
JBT, "JBT Continuous Rotary Pressure Sterilizer", video uploaded Feb. 2, 2016 <https://vimeo.com/153918897>.
Extended European Search Report dated Jul. 22, 2020 in EP Patent Application No. 17883233.3 (8 pages).
International Search Report and Written Opinion dated Apr. 19, 2013 in International Patent Application No. PCT/CA2013/050076 (12 pages).
Non-final Office Action and Notice of References Cited dated Jan. 7, 2016 in U.S. Appl. No. 14/375,331 (8 pages).
Partial European Search Report dated Jan. 16, 2018 in EP Patent Application No. 17176044.0 (12 pages).

\* cited by examiner

PACKAGING DEVICE FOR MEASURING MOTION IN MANUFACTURE

FIELD

The embodiments described herein relate to the field of manufacture, production, and packaging technology, and in particular, to methods and systems for tracking an article during manufacture, production, and packaging.

INTRODUCTION

The following paragraphs are not an admission that anything discussed in them is prior art or part of the knowledge of persons skilled in the art.

An article can be processed in a manufacturing, production, or packaging line. The manufacturing, production, or packaging line can include various stages including a steaming stage, a liquid stage, and a dry stage. During the steaming stage, the article can be subjected to very high temperatures for sterilization. During the liquid stage, the article can be immersed in liquid.

As an article is processed in the manufacturing, production, or packaging line, it may be subjected to various forces. For example, the article can be subjected to motion, that is, the article can be rotated around the circumference of a large rotating shell. Such forces can damage the article and/or affect the aesthetics of the article. When an article is damaged, the manufacturing, production, or packaging line may need to be stopped for trouble shooting. Such stoppages can require several hours as personnel investigate the packaging line to identify the cause of the damage and find a resolution to prevent damage to additional processing. Such stoppages reduce production output and efficiency.

SUMMARY OF SOME EMBODIMENTS

According to broad aspect, there is a system comprising a) a receptacle defining an interior storage chamber, the receptacle having an opening to the interior storage chamber; b) at least one sensor, the at least one sensor comprises a gyroscope for measuring angular velocity of the receptacle over a duration of time and generating measurement data indicative of the angular velocity over the duration of time, the at least one sensor being contained within the interior storage chamber, the at least one sensor having a fixed spatial relationship to the receptacle; and c) at least one processor configured for processing the measurement data.

In some embodiments, the processing the measurement data comprises determining a position of the receptacle within a rotating shell based on the angular velocity.

In some embodiments, the determining a position of the receptacle within a rotating shell based on the angular velocity comprises comparing the angular velocity to a first pre-determined angular velocity threshold, the first pre-determined angular velocity threshold being indicative of the receptacle travelling in a new rotation cycle of the rotating shell.

In some embodiments, a magnitude of the first pre-determined angular velocity threshold is about 100 degrees per second.

In some embodiments, the processing the measurement data further comprises determining an orientation of the receptacle based on the angular velocity; and a polarity of the first pre-determined angular velocity threshold being based on the orientation.

In some embodiments, the processing the measurement data further comprises determining tilt and rotation of the receptacle based on the orientation.

In some embodiments, the rotating shell is one of a plurality of rotating shells; the plurality of rotating shells comprise a shell transfer stage between two rotating shells; and the processing the measurement data further comprises determining a position of the receptacle amongst the plurality of rotating shells based on the angular velocity.

In some embodiments, the determining a position of the receptacle amongst the plurality of rotating shells based on the angular velocity comprises comparing the angular velocity to a second pre-determined angular velocity threshold, the second pre-determined angular velocity threshold being indicative of the receptacle travelling within the shell transfer stage.

In some embodiments, a magnitude of the second pre-determined angular velocity threshold is about 200 degrees per second, the second pre-determined angular velocity threshold and the first pre-determined angular velocity threshold having opposite polarities.

In some embodiments, the determining a position of the receptacle amongst the plurality of rotating shells based on the angular velocity further comprises comparing the angular velocity over the duration of time to the first pre-determined angular velocity threshold and a pre-determined rotation cycle threshold, the pre-determined rotation cycle threshold being indicative of the receptacle travelling within the shell transfer stage.

In some embodiments, the pre-determined rotation cycle threshold is at least about five rotation cycles.

In some embodiments, the gyroscope comprises a microelectromechanical system (MEMS) gyroscope.

In some embodiments, the at least one sensor comprises an accelerometer for measuring acceleration of the receptacle over the duration of time.

In some embodiments, the accelerometer comprises a microelectromechanical system (MEMS) accelerometer.

In some embodiments, the processing the measurement data comprises: a) determining shock of the receptacle within the rotating shell based on the acceleration; and b) correlating the shock to the position over the duration of time.

In some embodiments, the receptacle comprises heat resistant material capable of shielding electronics contained within the interior storage chamber from temperatures that exceed a maximum temperature rating of the electronics for a minimum time duration, the electronics comprising the at least one sensor.

In some embodiments, the electronics comprise an energy storage device; and the maximum temperature rating of the electronics comprises the maximum temperature rating of the energy storage device.

In some embodiments, the maximum temperature rating of the electronics is within the range of about 85 degrees Celsius to about 100 degrees Celsius.

In some embodiments, the minimum time duration is within the range of about 20 minutes to about 60 minutes.

In some embodiments, the heat resistant material comprises polyetherimide.

In some embodiments, the system further comprises a data storage medium coupled to the at least one processor for storing the measurement data.

In some embodiments, the system further comprises: a) a transmitter coupled to the at least one sensor for transmitting the measurement data when the receptacle is within a rotating shell, the transmitter being contained within the interior storage chamber; and b) a receiver coupled to the at least one processor for receiving the measurement data when the receptacle is within the rotating shell.

In some embodiments, the system further comprises one or more repeaters mounted on the rotating shell for receiving the measurement data from the transmitter and for transmitting the measurement data to the receiver.

In some embodiments, the receptacle further comprises a cap for closing the opening, the cap being removably attachable to the opening.

In some embodiments, the receptacle further comprises a seal surrounding at least one of the cap and the opening such that when the cap is removably attached to the opening, the interior storage chamber is impervious to liquids and gases.

In some embodiments, the receptacle and the cap have a form factor that is substantially similar to a form factor of an object processed by a rotating shell.

In some embodiments, the system further comprises a rim defining a portion of the form factor of the object; and the receptacle further comprises a receiving portion for removably attaching the rim to the receptacle.

In some embodiments, the rim further defines an opening for accessing the opening of the receptacle when the rim is removably attached to the receptacle.

In some embodiments, the object comprises a can; and the portion of the form factor of the object comprises at least one of a straight-wall shape and a necked-in shape.

In some embodiments, the object comprises a can; and the portion of the form factor of the object comprises at least one of a straight-wall shape and a necked-in shape.

In some embodiments, the rim is formed of a metallic material.

In some embodiments, the rim is coated with a coating for inhibiting corrosion of the metallic material.

In some embodiments, the system further comprises a core shaped to fit within the interior storage chamber, the core being removable from the interior storage chamber, and the interior storage chamber and the core being shaped to be mateable with one another for maintaining a fixed spatial relationship between the core and the receptacle.

In some embodiments, the at least one sensor being contained within the interior storage chamber comprises the core housing the at least one sensor and the core being placed within the interior storage chamber.

In some embodiments, an outer surface of the cap comprises at least one seat; and the system further comprises a tool for attaching and removing the cap to and from the receptacle, the tool having at least one member for engaging the at least one seat to hold the cap.

In another broad aspect, a method comprising a) providing a drone, the drone comprising at least one sensor, the at least one sensor comprising a gyroscope for measuring angular velocity of the drone over a duration of time; b) using the drone to generate measurement data indicative of the angular velocity when the drone is within a rotating shell; and c) processing the measurement data at at least one processor to determine a position of the drone within the rotating shell based on the angular velocity.

In some embodiments, the processing the measurement data comprises comparing the angular velocity to a first pre-determined angular velocity threshold, the first pre-determined angular velocity threshold being indicative of the drone travelling in a new rotation cycle of the rotating shell.

In some embodiments, a magnitude of the first pre-determined angular velocity threshold is about 100 degrees per second.

In some embodiments, the processing the measurement data further comprises determining an orientation of the drone based on the angular velocity; and a polarity of the first pre-determined angular velocity threshold is selected based on the orientation.

In some embodiments, the processing the measurement data further comprises determining tilt and rotation of the drone based on the orientation.

In some embodiments, the rotating shell is one of a plurality of rotating shells; the plurality of rotating shells comprise a shell transfer stage between two rotating shells; and the processing the measurement data further comprises determining a position of the drone amongst the plurality of rotating shells based on the angular velocity.

In some embodiments, the determining a position of the drone amongst the plurality of rotating shells based on the angular velocity comprises comparing the angular velocity to a second pre-determined angular velocity threshold, the second pre-determined angular velocity threshold being indicative of the drone travelling within the shell transfer stage.

In some embodiments, a magnitude of the second pre-determined angular velocity threshold is about 200 degrees per second, the second pre-determined angular velocity threshold and the first pre-determined angular velocity threshold having opposite polarities.

the determining a position of the drone amongst the plurality of rotating shells based on the angular velocity further comprises comparing the angular velocity over the duration of time to the first pre-determined angular velocity threshold and a pre-determined rotation cycle threshold, the pre-determined rotation cycle threshold being indicative of the drone travelling within the shell transfer stage.

In some embodiments, the at least one sensor further comprises an accelerometer for measuring acceleration of the drone over the duration of time; the measurement data is further indicative of the acceleration; the processing the measurement data further comprises: determining shock of the drone within the rotating shell based on the acceleration; and correlating the shock to the position over the duration of time.

In some embodiments, the method further comprises storing the measurement data on a data storage medium coupled to the at least one processor.

In some embodiments, the method further comprises transmitting the measurement data to at least one of a receiver coupled to the at least one processor and a repeater mounted on the rotating shell.

In some embodiments, the rotating shell is one of a plurality of rotating shells; the plurality of rotating shells comprise a shell transfer stage between two rotating shells; and the processing the measurement data further comprises determining a position of the drone amongst the plurality of rotating shells based on a known translational velocity of the drone associated with each rotating shell in the plurality of rotating shells and an elapsed time relative to the drone's time of entry into the rotating shell.

In some embodiments, the at least one sensor further comprises an accelerometer for measuring acceleration of the drone over the elapsed time; the measurement data is further indicative of the acceleration; the processing the measurement data further comprises: i) determining shock of the drone within the rotating shell based on the acceleration and a time of shock; and ii) correlating the shock of the drone to the position determinable based on the time of shock and the known translational velocity.

Further aspects and advantages of the embodiments described herein will appear from the following description taken together with the accompanying drawings.

BRIEF DESCRIPTION OF THE DRAWINGS

For a better understanding of the embodiments described herein and to show more clearly how they may be carried into effect, reference will now be made, by way of example only, to the accompanying drawings which show at least one exemplary embodiment, and in which.

Figure 1A:
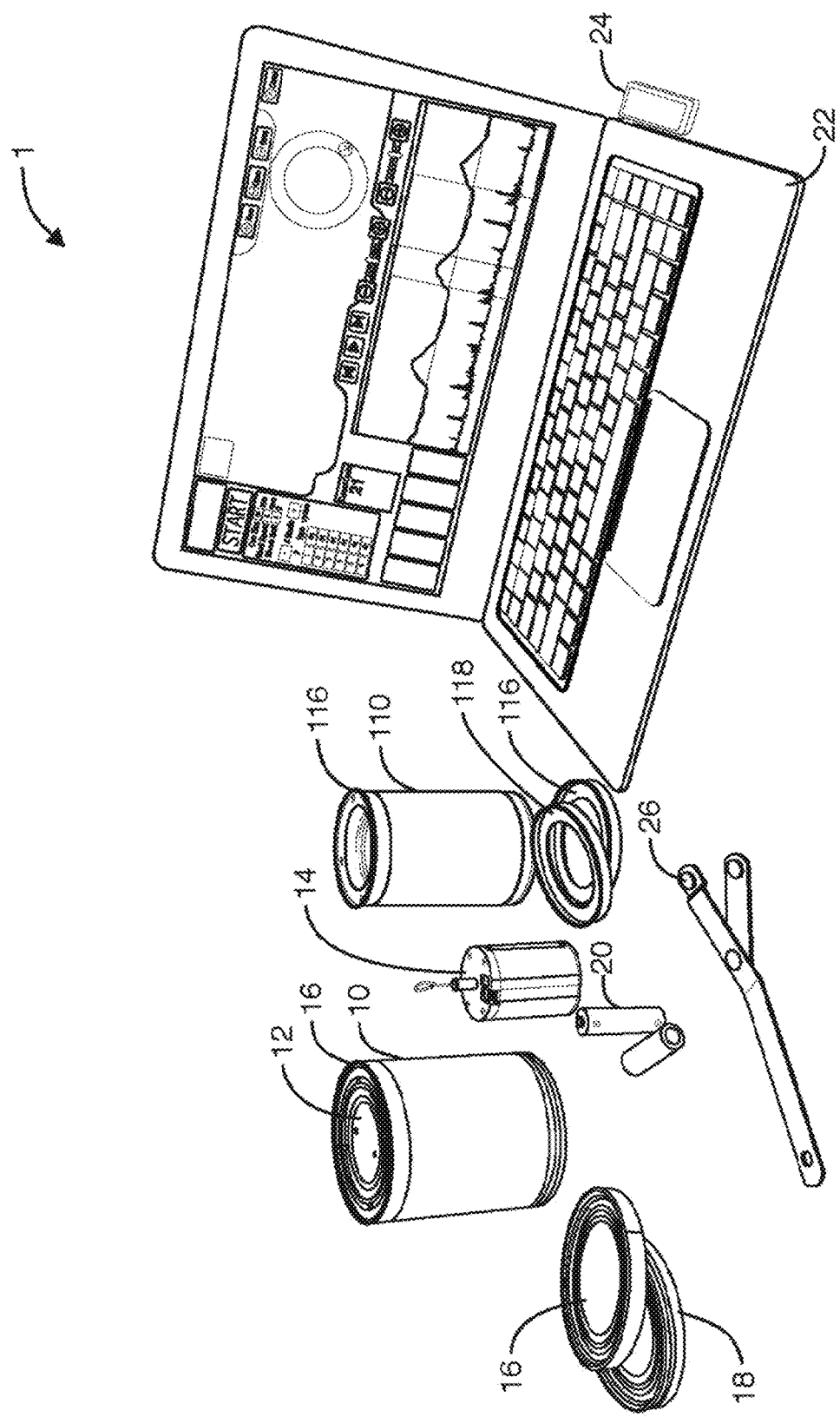
FIGS. 1A, 1B, 1C and 1D are illustrations of a system for measuring and analyzing an object within a rotating shell, according to one embodiment.

The skilled person in the art will understand that the drawings, described below, are for illustration purposes only. The drawings are not intended to limit the scope of the applicants' teachings in anyway. Also, it will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DESCRIPTION OF VARIOUS EMBODIMENTS

It will be appreciated that numerous specific details are set forth in order to provide a thorough understanding of the exemplary embodiments described herein. However, it will be understood by those of ordinary skill in the art that the embodiments described herein may be practiced without these specific details. In other instances, well-known methods, procedures and components have not been described in detail so as not to obscure the embodiments described herein. Furthermore, this description is not to be considered as limiting the scope of the embodiments described herein in any way, but rather as merely describing the implementation of the various embodiments described herein.

It should be noted that terms of degree such as "substantially", "about" and "approximately" when used herein mean a reasonable amount of deviation of the modified term such that the end result is not significantly changed. These terms of degree should be construed as including a deviation of the modified term if this deviation would not negate the meaning of the term it modifies.

The terms "an embodiment," "embodiment," "embodiments," "the embodiment," "the embodiments," "one or more embodiments," "some embodiments," and "one embodiment" mean "one or more (but not all) embodiments of the subject matter described in accordance with the teachings herein," unless expressly specified otherwise.

The terms "including," "comprising" and variations thereof mean "including but not limited to", unless expressly specified otherwise. A listing of items does not imply that any or all of the items are mutually exclusive, unless expressly specified otherwise. In addition, the terms "a," "an" and "the" mean "one or more," unless expressly specified otherwise.

In addition, as used herein, the wording "and/or" is intended to represent an inclusive-or. That is, "X and/or Y" is intended to mean X or Y or both, for example. As a further example, "X, Y, and/or Z" is intended to mean X or Y or Z or any combination thereof.

It should also be noted that the terms "coupled" or "coupling" as used herein can have several different meanings depending in the context in which these terms are used. For example, the terms coupled or coupling can have a mechanical or electrical connotation. For example, as used herein, the terms coupled or coupling can indicate that two elements or devices can be directly connected to one another or connected to one another through one or more intermediate elements or devices via an electrical element or electrical signal (either wired or wireless) or a mechanical element depending on the particular context.

Further, although processes, methods, and the like may be described (in the disclosure and/or in the claims) having acts in a certain order, such processes and methods may be configured to work in alternate orders while still having utility. In other words, any sequence or order of actions that may be described does not necessarily indicate a requirement that the acts be performed in that order. The acts of processes and methods described herein may be performed in any order that is practical and has utility. Further, some actions may be performed simultaneously, if possible, while others may be optional, if possible.

When a single device or article is described herein, it may be possible that more than one device/article (whether or not they cooperate) may be used in place of a single device/article. Similarly, where more than one device or article is described herein (whether or not they cooperate), it may be possible that a single device/article may be used in place of the more than one device or article.

Articles along a manufacturing line may be subjected to various forces. For example, in food processing, food products (e.g. fruit, ready-to-eat meals, sauces, soups, infant formula, juices etc.) held in various types of containers (i.e. articles) may go through various processing stages before the product is ready for shipment from a processing plant. One of the processing stages may be include a sterilization process at high temperatures using a high capacity rotational sterilizer as shown in FIG. 1D.

Figure 1B:
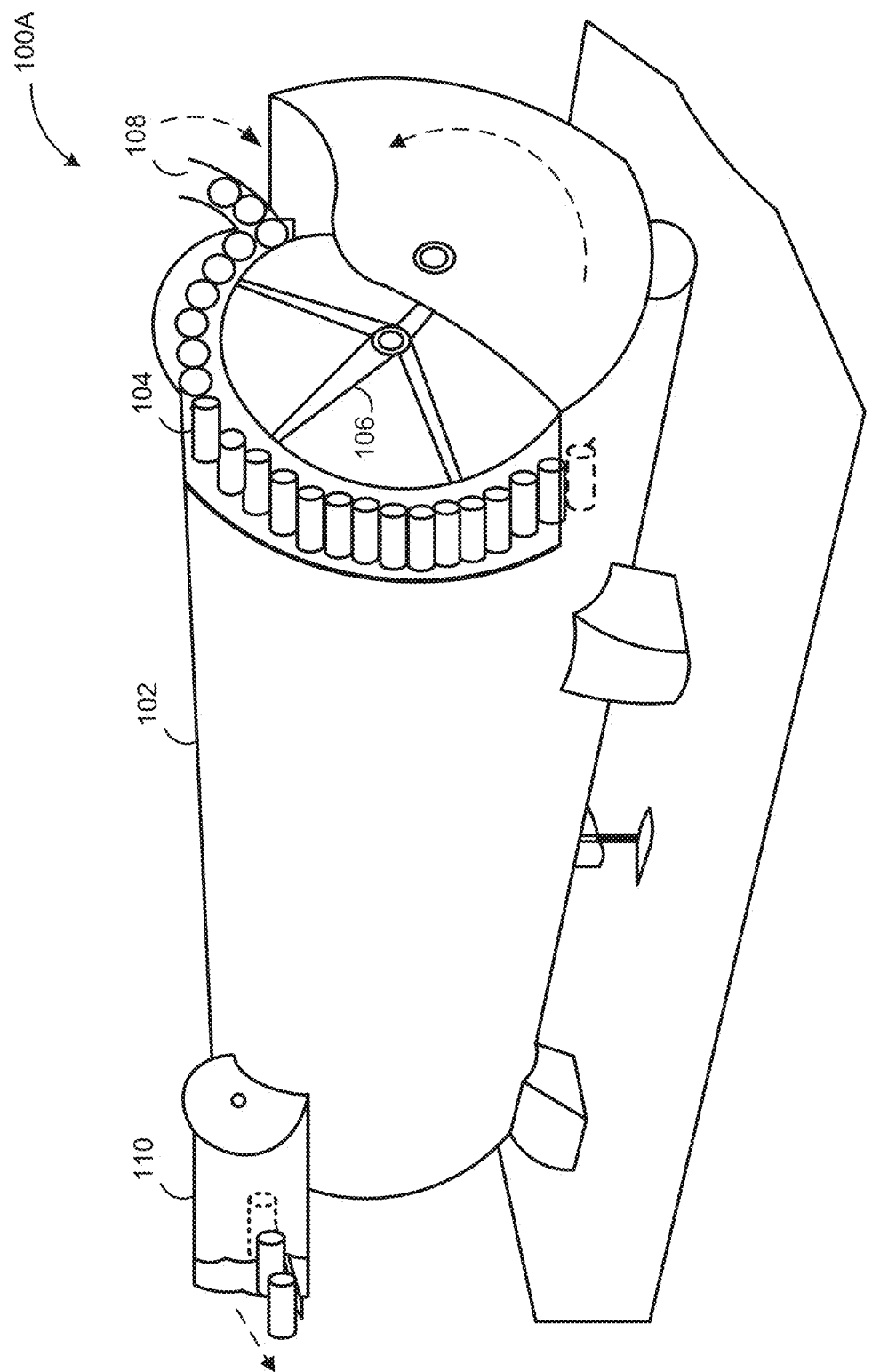

The rotational sterilizer system 100A of FIG. 1B may be used for sterilizing articles 104 such as cans or bottles etc.

Figure 1C:
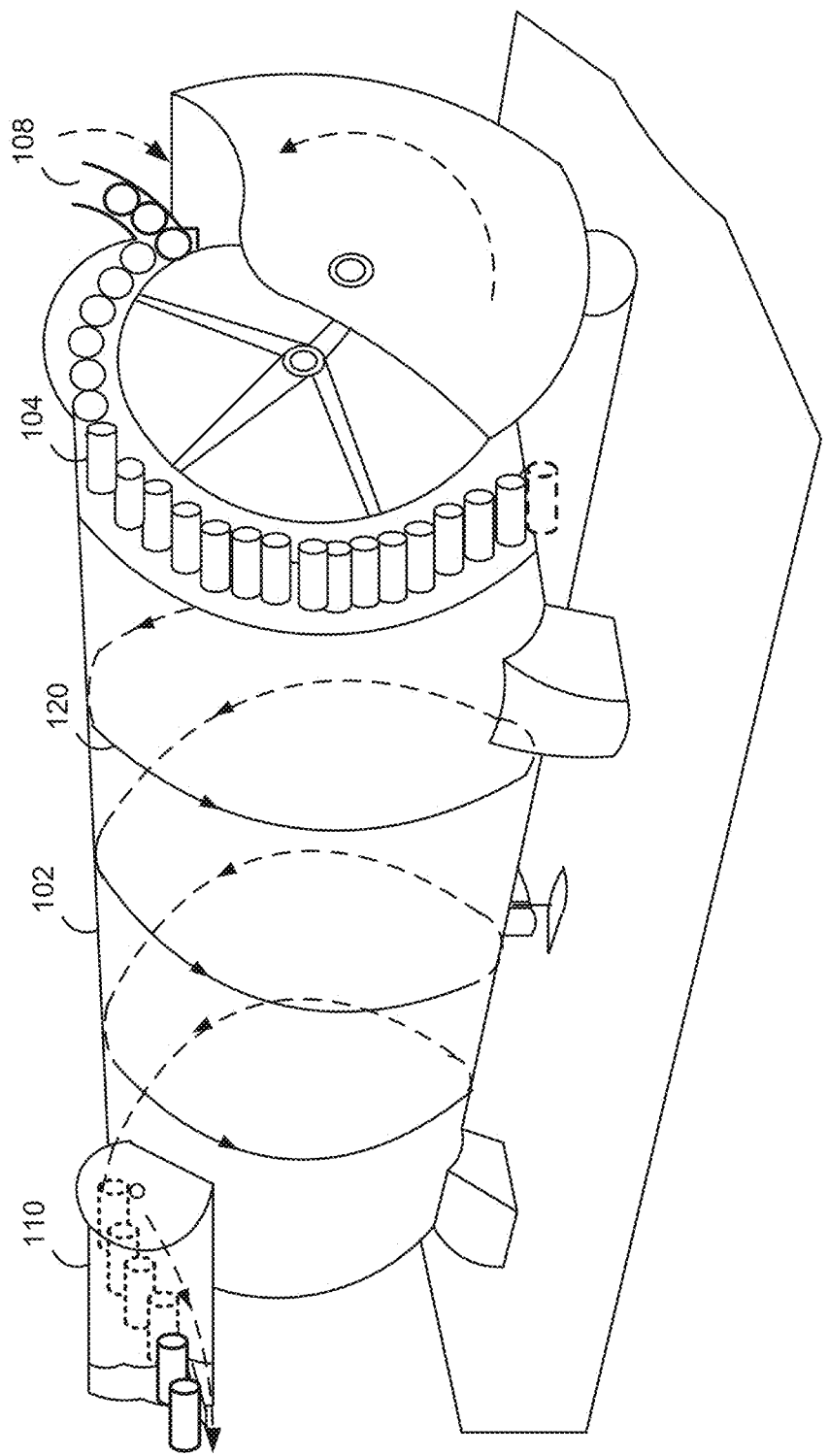
Figure 1D:
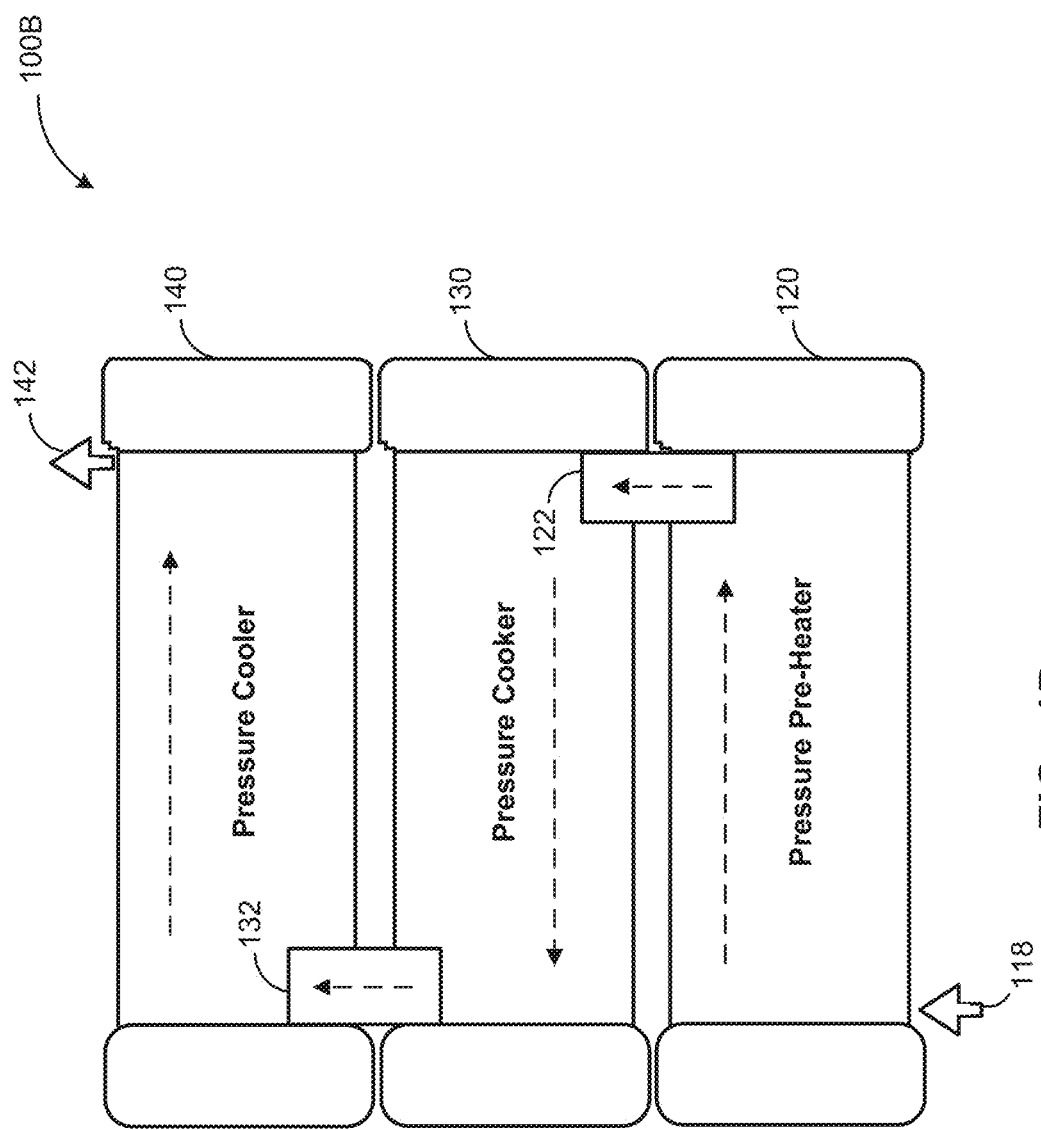

The rotational sterilizer includes a cylindrical rotational shell 102 with a rotatable wheel 106 to rotate articles 102 along a rotational path. Articles 104 may enter the shell 102 at an entry port 108 and be fed to the rotatable wheel 106 for processing. When the wheel 106 operates in conjunction with a stationary spiral (not shown), the articles 104 may advance along the length of the shell 102 away from the entry port 108 as the articles 104 are rotated by the wheel 106. For example, as shown in FIG. 1C, an article may follow a helical path of movement tracing along an inner circumference of the rotational shell 102, as indicated by movement path 120. While being rotating along the inner circumference of the rotational shell 102, the articles 104 proceed from entry side of the rotational shell 102 to the exit side of the rotational shell 102.

In some embodiments, the rotational speed of the rotatable wheel 106 may be fixed. In other embodiments, the rotational speed may be controllable by a controller module. The rotational speed may therefore be used to control the speed at which an article advances along the shell. After processing, the articles may exit the shell 102 at an exit port 110 as indicated by the dashed arrow.

An article can be rotated through a number of cycles, or rotations around the circumference of each shell before moving on to a subsequent shell. An article can be rotated through any number of cycles per shell that is appropriate. For example, an article can undergo approximately thirty (30) to fifty (50) cycles in a single rotating shell before moving onto the next shell. Furthermore, an article can be rotated in a single rotating shell for approximately 10 minutes.

Each packaging line can include more than one rotating shell. For example, some packaging lines can include 2 to 6 shells. FIG. 1D is a diagram of rotational sterilizer system 100B comprising multiple processing stages, each processing stage being a separate rotational shell denoted by reference numerals 120, 130, 140, corresponding to a pressure pre-heater, pressure cooker and pressure cooler, respectively. In the system 100B of FIG. 1D, the articles 102 may enter the rotational sterilizer system 1006 at an entry port 118 and leave the system at an exit port 142. When a packaging line includes more than one rotating shell, one or more shell transfer stages can be provided between two rotating shells. For example, as shown in FIG. 1D a first transfer stage 122 may be used to transfer articles between Pressure Pre-Heater shell 120 and a Pressure Cooker shell 130. Similarly a second transfer 132 stage may be used to transfer articles between the Pressure Cooker shell 130 to the Pressure Cooler shell 140. The dashed arrows are used to indicate the direction of movement of the articles within the rotating shells.

During operation of system 100B, articles may be first introduced into the pressure pre-heater 120. The pressure pre-heater 120 may be a water-filled shell comprising heated water used to pre-heat the articles 102. Articles 102 may become heated in the pressure pre-heater 120 as they advance from the entry side to the exit side. Once the articles 102 have been heated to a desired temperature, the articles 102 may be transferred to the pressure cooker 130 for sterilization via the first transfer stage 122. The pressure cooker 130 may be used to generate appropriate steam for sterilization. It may be noted that the entry side of the pressure cooker 130 may be aligned with the exit side of the pressure pre-heater 120 to facilitate transfer of articles between rotational shells. The entry side of the pressure cooler 140 may similarly be aligned with the exit side of the pressure cooker 130 to facilitate transfer of articles via the second transfer stage 132. The pressure cooler 140 may be another water-filled shell comprising water to cool down the heated articles. The articles may be retrieved at the exit port 142.

The time duration that an article can pass through a packaging line having one or more rotating shells can be in the range of approximately twenty (20) to sixty (60) minutes. For example, the time duration that an article can pass through a packaging line having one or more rotating shells can be approximately forty (40) minutes.

Referring back to FIG. 1A, illustrated therein is a system 1 for measuring and analyzing the movement of an object within a rotating shell such as rotational shell 102 of FIG. 1B, according to one embodiment. The system 1 generally includes a receptacle 10 and 110, at least one sensor (not shown), and at least one processor 22. In some embodiments, the system 1 can also include one or more rims 16, 18, 116, and 118, and a tool 26.

Figure 3:
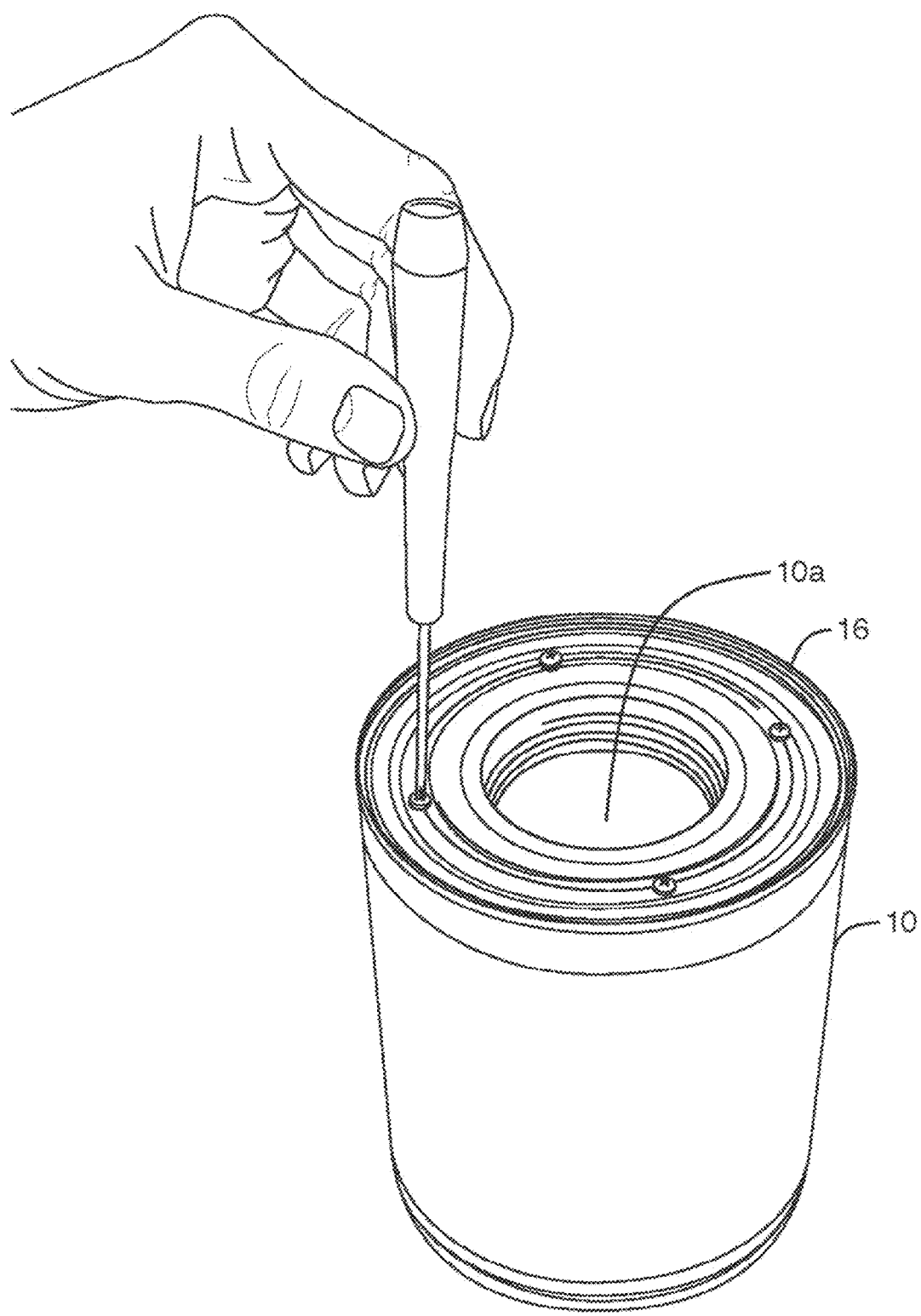
FIG. 3 is an enlarged top view of a receptacle of a system for measuring and analyzing an object within a rotating shell, according to one embodiment.

The receptacle 10 can have a hollow structure defining an interior storage chamber 10a (shown in FIG. 3). The receptacle 10 can be used to store or house electronics within the interior storage chamber 10a. As shown by receptacles 10 and 110, the receptacle can have different sizes. It will be understood that the features described in respect of receptacle 10 are also applicable to receptacle 110.

The receptacle 10 can have a top opening that can be enclosed by a cap 12. In some embodiments, the cap 12 can be removably attached to the receptacle 10. In some embodiments, the cap 12 can be detached from the top opening of the receptacle 10 but remain attached from the receptacle 10 by an arm or attachment member. In some embodiments, the system 1 can include a tool 26 for attaching and removing the cap 12 to and from the receptacle 10.

In some embodiments, the electronics can be assembled in one or more hardware units. The one or more hardware units are herein referred to as a "core" 14. The core 14 can be placed in the interior storage chamber 10a of the receptacle 10 (shown in FIG. 4). The assembly of the electronics in a core 14 allows for ease of access to the electronics and better environmental protection of the electronics from heat and liquids.

Figure 6:
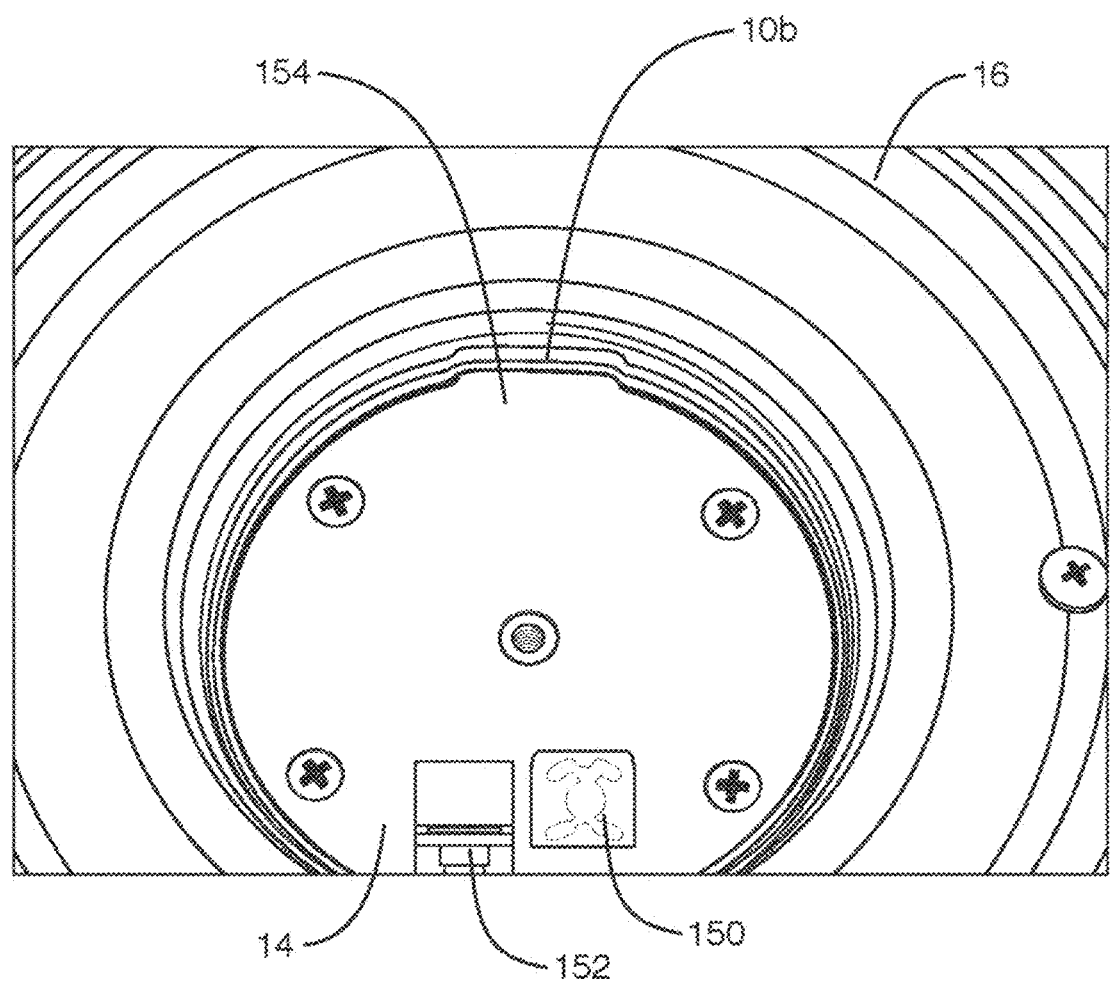
FIG. 6 is another perspective view of a receptacle of a system for measuring and analyzing an object within a rotating shell, according to one embodiment.

In some embodiments, the interior storage chamber 10a and the core 14 can be shaped to be mateable to one another (shown in FIG. 6). That is, the interior storage chamber 10a and the core 14 can have cooperating structures so that the interior storage chamber 10a retains the core 14 in a manner that prevents appreciable movement of the core 14 in relation to the interior storage chamber 10a.

The electronics can include the at least one sensor and any other components required for the operation of the at least one sensor. For example, the electronics can include an energy storage device, such as batteries 20.

The at least one sensor can include, but is not limited to a gyroscope and an accelerometer. A gyroscope can measure angular velocity (w) experienced by the gyroscope. The gyroscope can be a microelectromechanical system (MEMS) gyroscope. An accelerometer can measure acceleration experienced by the accelerometer. The accelerometer can be a microelectromechanical system (MEMS) accelerometer.

As set out above, the sensors can be configured to not move within the receptacle 10. That is, the at least one sensor can be mounted to the receptacle 10 such that the at least one sensor has a fixed spatial relationship to the receptacle 10. In this manner, the angular velocity experienced by the gyroscope can be substantially the same as the angular velocity experienced by the receptacle 10. Similarly, the acceleration experienced by the accelerometer can be substantially the same as the acceleration experienced by the receptacle 10.

With the at least one sensor mounted to the receptacle 10, the at least one sensor can generate measurement data indicative of the conditions experienced by the receptacle 10. For example, the receptacle 10 can be representative of an article, or a container that is processed in a packaging line. That is, the receptacle 10 can be a drone for the container. For example, receptacle 10 may be placed into system sterilization system 100A or 100B of FIGS. 1B and 1D, respectively, as if it was one of the articles 104. The receptacle 10 can then be used to measure and/or monitor the forces the articles 104, or the container would be subjected to when it is advancing along a rotational shell and being transferred between one shell to another shell in a transfer stage as it is being processed.

In some embodiments, when the at least one sensor includes a gyroscope, the angular velocity from the gyroscope can be used to compute an orientation of the receptacle 10. Based on the orientation of the receptacle 10, a tilt and rotation of the receptacle 10 can be determined as well.

In some embodiments, when the at least one sensor also includes an accelerometer, the acceleration from the accelerometer can be used to determine the shock that the receptacle 10 is subjected to. Based on the time instant that the shock occurs, the shock can be correlated to the position of the receptacle 10. Hence, the location within the packaging line that causes damage to an article can be identified.

The system 1 can include at least one processor 22 for processing and/or analyzing the measurement data generated by the at least one sensor. As shown in FIG. 1A, the at least one processor 22 can be a portable laptop computer. However, the at least one processor 22 can be any suitable computing device, such as a desktop computer, a mobile device such as a smartphone or a tablet computer, a microprocessor, or a server. Although shown as a single processor 22, in some embodiments, the processor 22 can be distributed such that functionality of the processor 22 resides on separate computing devices.

In some embodiments, the system 1 can include a transmitter located within the core 14. The transmitter can be coupled to the at least one sensor for receiving measurement data from the sensor and transmitting the measurement data to the at least one processor 22 over a network. In such embodiments, the processor 22 can include a receiver for receiving the measurement data from the transmitter over the network. When the measurement data is transmitted to the at least one processor 22 while the receptacle 10 is in the packaging line, the measurement data can be analyzed in substantially real-time.

In some embodiments, the system 1 can include a memory storage device 24. The memory storage device 24 can be a part of the electronics in the core 14 and placed in the interior storage chamber 10a (FIG. 3). The measurement data can be stored on the memory storage device 24 while the receptacle 10 is processed in the packaging line. After the receptacle 10 is removed from the packaging line, the measurement data can be retrieved from the memory storage device 24 by the at least one processor 22.

A system 1 including a memory storage device 24 can be appropriate if, for example, the packaging line can include components that interfere with the wireless communication over a network. For example, a rotating shell in a packaging line can be made of stainless steel with a thickness of about one quarter (¼) to three quarters (¾) of an inch.

In some embodiments, the memory storage device 24 maybe integrated into the core in a manner that may not be removable. The memory storage device 24 may be chosen to be sufficiently large to allow recordation of data provided by the various sensors associated with receptacle 10 during its use in the packaging line. The receptacle 10 may be provided with an appropriate data transfer interface, including but not limited to, a USB interface to allow for synchronization and/or extraction of data to the at least one processor 22 via an appropriate data cable.

In some examples, repeaters can be provided within the packaging line to reduce such interference. In particular, repeaters can receive the measurement data from the transmitter and transmit the measurement data to the at least one processor 22 over the network. Furthermore, when more than one repeater is provided within a packaging line, the repeaters can transmit the measurement data to one another in sequence, or successively. When the repeaters transmit the measurement data in sequence, a first repeater receives the measurement data from the transmitter and a last repeater transmits the measurement data to the at least one processor 22. Repeaters can be provided in any appropriate location within the packaging line. For example, repeater can be situated on one or more rotating shells.

The at least one processor 22 can be used to analyze the measurement data. Various analysis can be performed on the measurement data. In some examples, the measurement data can provide information about the forces experienced by the receptacle 10 in the packaging line. Furthermore, the measurement data can provide information about the location of the receptacle 10 within the packaging line at the time that such forces are experienced. In particular, a packaging line can include one or more rotating shells and shell transfers between rotating shells. Given the number of rotating shells and shell transfers, and the number of cycles per shell, the measurement data can be analyzed to determine which of the one or more rotating shells or shell transfers the receptacle 10 is located in and if the receptacle 10 is located in a rotating shell, which cycle of the rotating shell the receptacle 10 is in. The measurement data can be displayed on a graphical interface and replayed for analysis.

Figure 2:
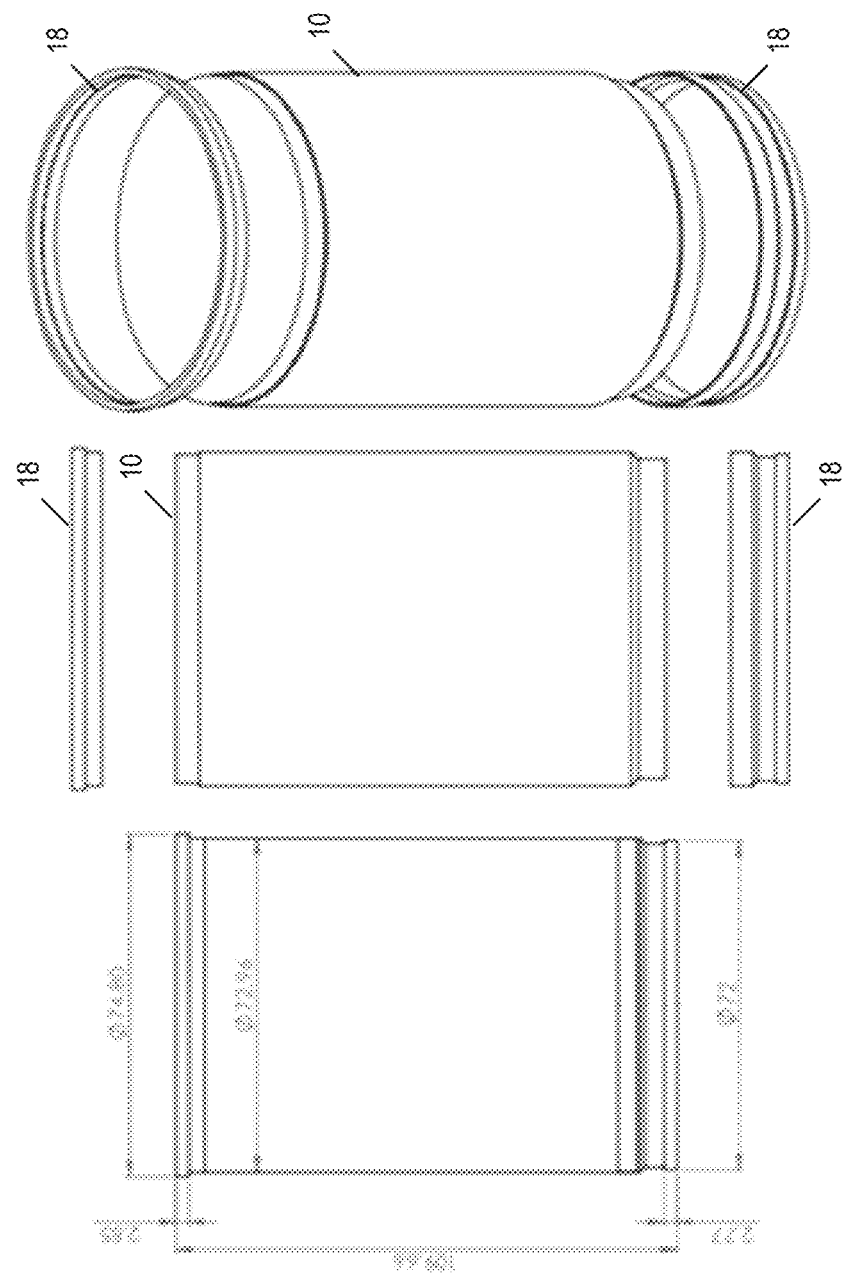
FIG. 2 is a perspective and side views of a receptacle of a system for measuring and analyzing an object within a rotating shell, according to one embodiment.

Referring now to FIG. 2, illustrated therein is a perspective and side views of a receptacle of a system for measuring and analyzing an object within a rotating shell, according to one embodiment.

Rims 18 can be attached to the receptacle 10. As shown in FIG. 2, a rim 18 can be attached to a top end of the receptacle 10 and a rim 18 can be attached to a bottom end of the receptacle 10. Rims 18 and the receptacle 10 can have mateable structures for attachment. For example, the receptacle 10 in FIG. 2 is recessed at the top end and at the bottom end. Each rim 18 has a corresponding structure to fit over the recessed portions of the receptacle 10. Rims 18 can be attached to the receptacle 10 by any appropriate fastening means. For example, the recesses of receptacle 10 shown in FIG. 2 can have protrusions, or ridges, for rim 18 to be twisted onto the receptacle 10.

In some embodiments, rim 18 can be made of metallic material. In some embodiments, rim 18 can be coated with corrosion-inhibiting material to prevent corrosion of rim 18. Such corrosion-inhibiting material can be preferable when rim 18 is made of metallic material and the packaging line includes conditions conducive to corrosion, such as water and/or steam.

The rim 18 can have a shape that, when attached to the receptacle 10, mimics the shape, or form factor of the container normally processed in the packaging line. For example, cans may have different shapes such as a straight-wall shape or a necked-in shape. The rim 18 (shown in the side views of FIG. 2) is representative of a necked-in shape. When removably attached to the receptacle 10, the receptacle can be representative of a necked-in can. The rim 16 (shown in FIG. 1A) is representative of a straight-wall shape. When removably attached to the receptacle 10, the receptacle can be representative of a straight-wall can.

Referring now to FIG. 3, illustrated therein is a perspective view of a receptacle of a system for measuring and analyzing an object within a rotating shell, according to one embodiment.

As set out above, rims 16, 18, 116, and 118 (FIG. 1A) can be attached to the receptacles 10 and 110 by any appropriate fastening means. Another example is shown in FIG. 3, in which straight-walled rim 16 can be removably attached to the receptacle 10 using screws. When the straight-walled rim 16 is attachable to the receptacle 10 using screws, the straight-walled rim 16 can have a face that encloses a portion of the top opening of the receptacle 10. However, the face of the straight-walled rim 16 can have an opening that aligns with the top opening of the receptacle 10 to retain access to the interior storage chamber 10a.

Figure 4:
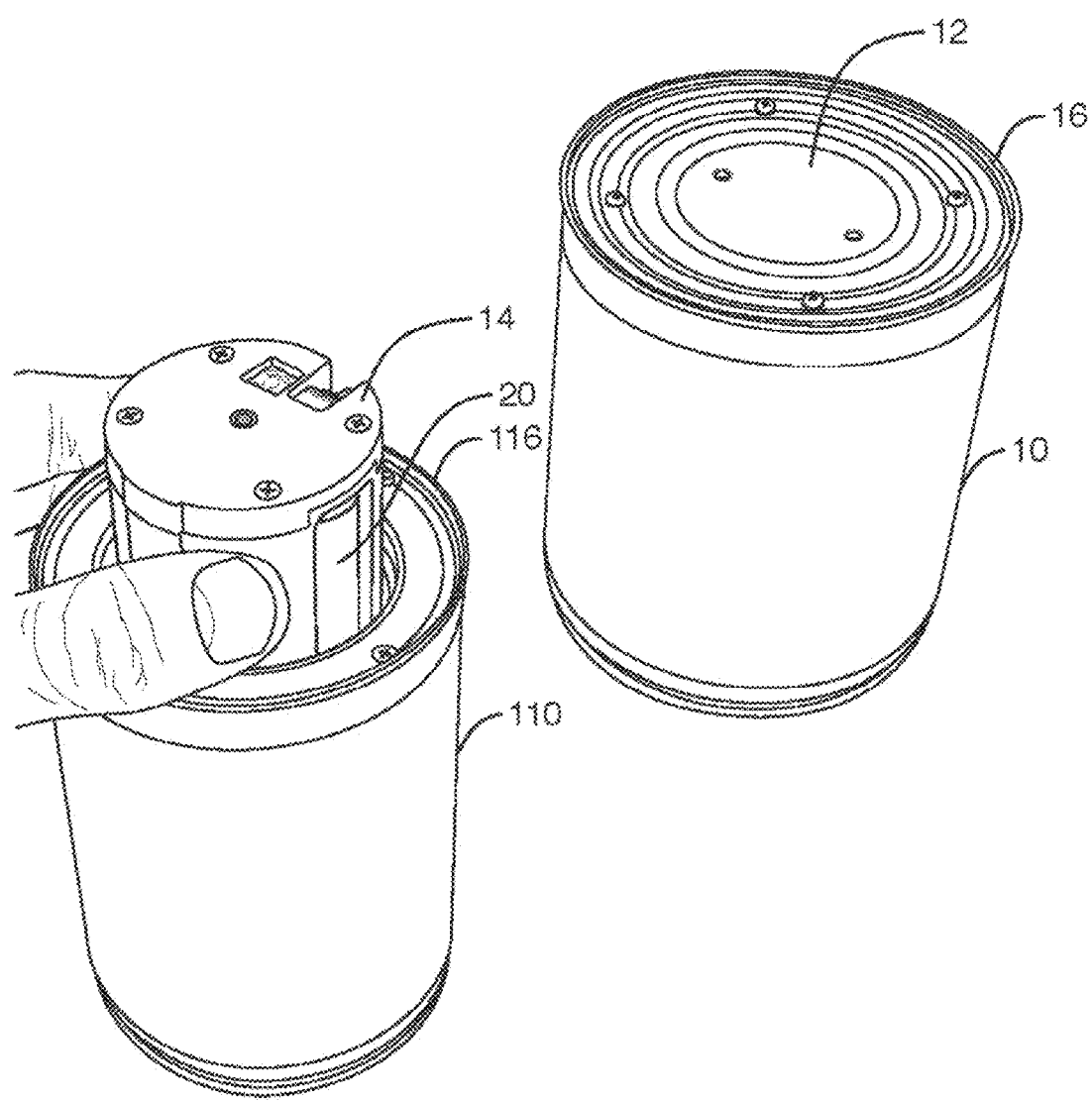
FIG. 4 is a perspective view of receptacles and electronics of a system for measuring and analyzing an object within a rotating shell, according to one embodiment.

Referring now to FIG. 4, illustrated therein is a perspective view of receptacles of a system for measuring and analyzing an object within a rotating shell, according to one embodiment. As shown in FIG. 4, receptacles 10 and 110 can have different sizes. Rim 16 has a size that corresponds with the receptacle 10. Rim 116 has a size that corresponds with the receptacle 110.

The top opening of the receptacle 110 and the opening of rim 116 permits access to the interior storage chamber 10a. A core 14 to be placed within the interior storage chamber 10a of the receptacle 10 while the rim 16 is attached to the receptacle 10. As shown in FIG. 4, the core 14 can include house the electronics, including batteries 20. As well, the top opening of the receptacle 10 and the rim 16 can be enclosed by cap 12.

In some embodiments, the receptacles 10 and 110 can include heat resistant material. The heat resistant material can shield electronics of the core 14 contained within the interior storage chamber 10a. Electronics generally have a maximum temperature rating at which the electronics remain operable. For example, may electronics can have a maximum temperature rating of approximately 100 degrees Celsius. The lowest maximum temperature rating of all of the electronics in the core 14 can be considered the maximum temperature of the electronics. In some embodiments, batteries can have the lowest maximum temperature rating of all the electronics in the core 14. For example, batteries can have a maximum temperature rating of about 85 degrees Celsius. Furthermore, the maximum temperature rating can be specified for some time duration. For example, batteries can be subjected to the maximum temperature rating for about 20 minutes to about 60 minutes before being inoperable.

The heat resistant material of the receptacles 10 and 110 can shield the electronics such that while the receptacles 10 and 110 are subjected to temperatures that exceed the maximum temperature rating of the electronics, the electronics are not subjected to the same temperature. That is, the heat resistant material of the receptacles 10 and 110 can insulate the electronics from high temperatures for some pre-determined time duration. Any appropriate heat resistant material can be used. Exemplary heat resistant material include, but is not limited to, polyetherimide (PEI) and polyether ether ketone (PEEK). PEI is amorphous amber-to transparent thermoplastic with high thermal resistance. PEEK is another type of thermoplastic polymer material with characteristics suitable for use as a heat resistant material including higher impact strength and greater heat resistance temperature range relative to PEI. On the other hand, the cost of PEI is generally lower relative to PEEK. As such, depending on the conditions of use, the appropriate material may be selected based on at least the above identified physical characteristics.

Figure 5:
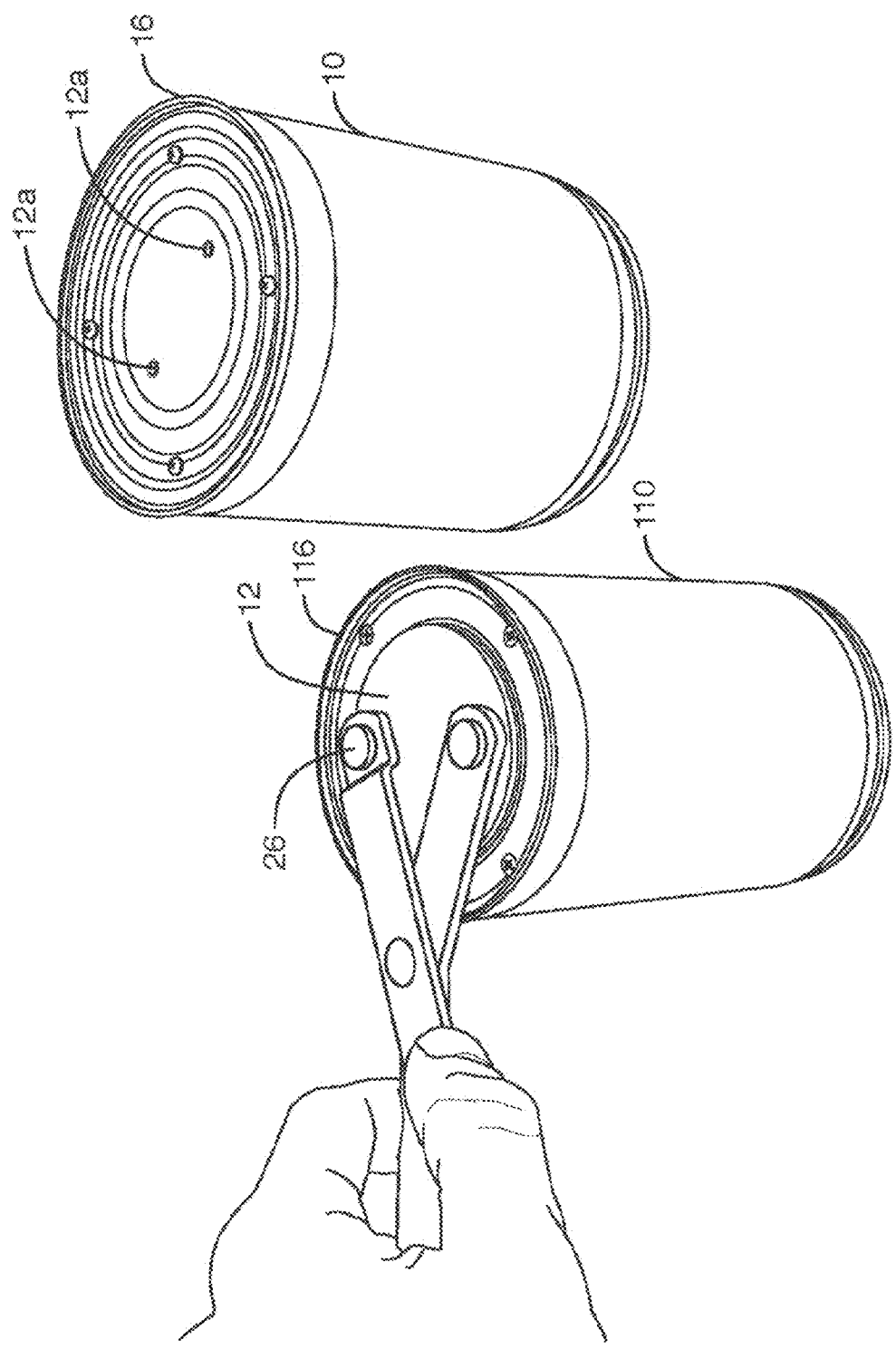
FIG. 5 is a perspective view of receptacles of a system for measuring and analyzing an object within a rotating shell, according to one embodiment.

Referring now to FIG. 5, illustrated therein is a perspective view of receptacles of a system for measuring and analyzing an object within a rotating shell, according to one embodiment. As shown in FIG. 5, a tool 26 can be used for attaching and removing the cap 12 to and from the receptacles 10 and 110.

The cap 12 can include engaging members 12a. As shown in FIG. 5, the engaging members 12a can be recesses and the tool 26 can have corresponding protrusions, or corresponding engaging members to fit in the recesses. To operate the tool 26, the engaging members of the tool, that is, the protrusions of the tool 26 can be inserted in the engaging members 12a of the members of the cap, that is the recesses. The arms of the tool 26 can be used to apply a force transverse to the recesses to hold the cap 12. A force transverse to the recesses can be a force in a direction that pinches the recesses together. A force transverse to the recesses can also be a force in a direction that pushes, or spreads the recesses apart. When the tool 26 has engaged the cap 12, the tool 26 can be rotated to rotate the cap 12 and fit within the top opening of the receptacle 10. The tool 26 can disengage and release the cap 12 by releasing the force transverse to the recesses.

The receptacles 10 and 110 can include a seal surrounding the top opening. When the cap 12 encloses the top opening of the receptacles 10 and 110, the seal can provide a barrier that is impervious to liquids and gases. The seal can prevent liquids and gases from entering the interior storage chamber 10a where the core 14 and electronics can be stored.

Referring now to FIG. 6, illustrated therein is an enlarged top view of a receptacle of a system for measuring and analyzing an object within a rotating shell, according to one embodiment. As shown in FIG. 6, the interior storage chamber 10a and the core 14 can have are cooperating structures 10b and 154 for mating to one another. For example, the interior storage chamber 10a can have a seat, groove, or recess 10b and the core 14 can have a corresponding protrusion 154 that is shaped to fit the seat 10b. In other examples, the cooperating structure 10b of the interior storage chamber 10a can be a protrusion and the cooperating structure 154 of the core 14 can be a seat. The cooperating structures of the interior storage chamber 10a and the core 14 maintain a fixed spatial relationship between the at least one sensor, located in the core 14, and the interior storage chamber 10a of the receptacle 10.

Also shown in FIG. 6, the core can include switch 152 for controlling power to the electronics, and indicator 150 for indicating whether the electronics are powered on or off.

Figure 7:
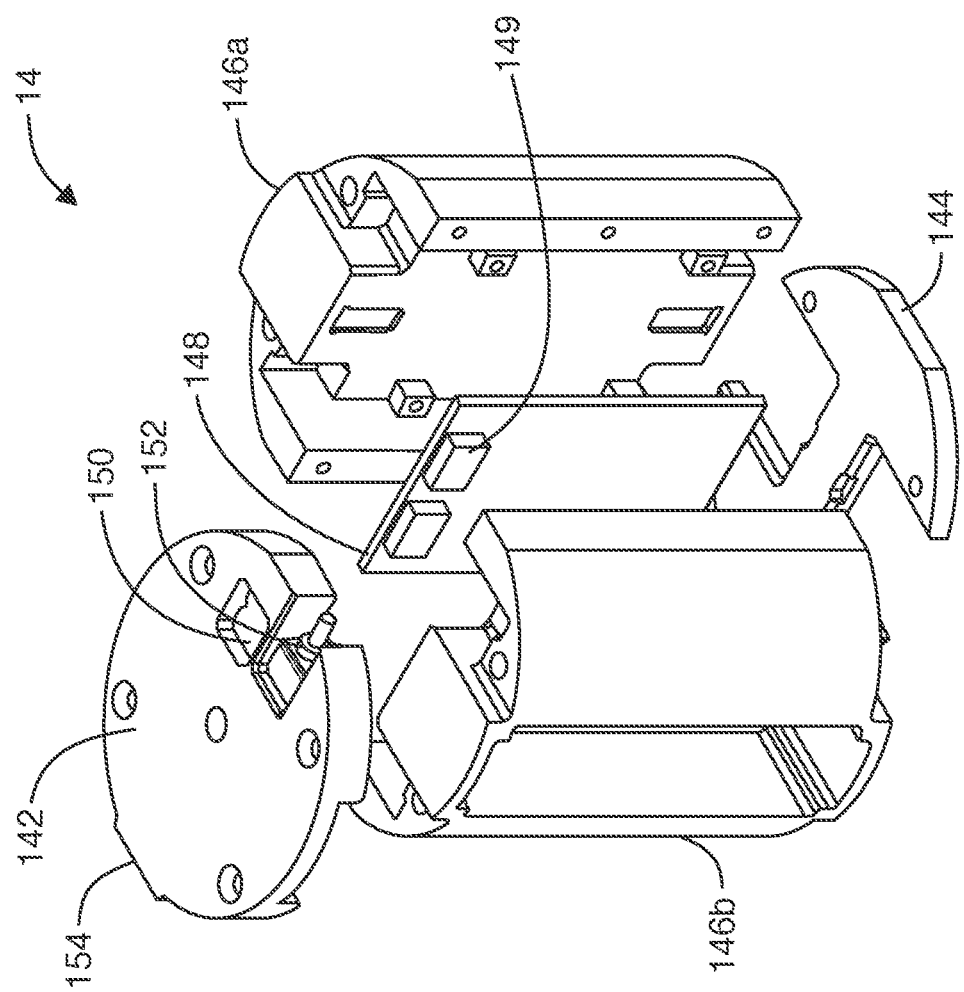
FIG. 7 is an exploded view of electronics in a receptacle of a system for measuring and analyzing an object within a rotating shell, according to one embodiment.

Referring now to FIG. 7, illustrated therein is an exploded view of electronics in a receptacle of a system for measuring and analyzing an object within a rotating shell, according to one embodiment. As shown in FIG. 7, the core 14 can include a circuit board 148 enclosed by a top face 142, a bottom face 144, a first body 146a, a second body 146b. The first body 146a and the second body 146b can include cavities for receiving batteries 20. The electronics, including the at least one sensor, can be coupled to the circuit board 148 (see e.g. sensor 149, which may be in the form of a MEMS gyroscope).

Figure 8:
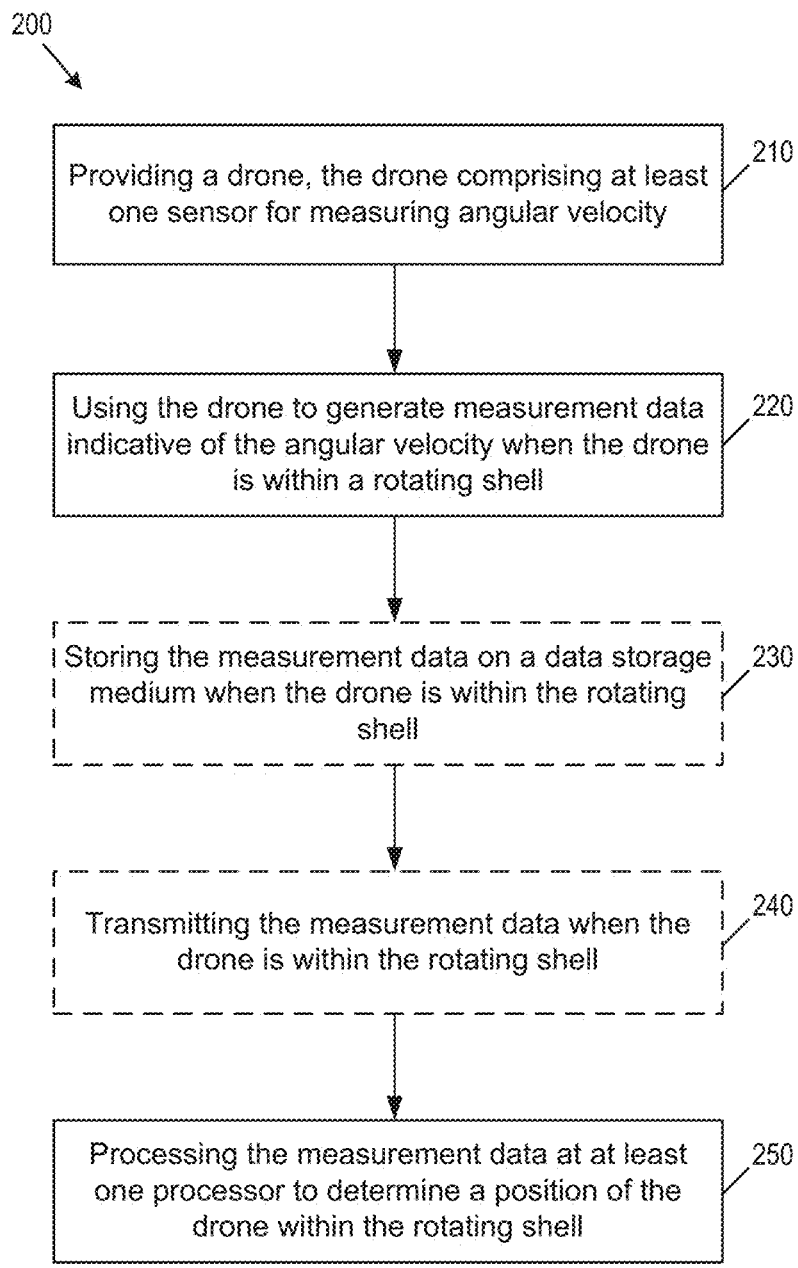
FIG. 8 is a flowchart diagram illustrating the steps of a method for measuring and analyzing an object within a rotating shell, according to one embodiment.

Referring now to FIG. 8, shown therein is a flowchart diagram illustrating the steps of a method 200 for measuring and analyzing an object within a rotating shell, according to one embodiment. The method 200 can begin, at step 210 with providing a drone. The drone can include at least one sensor for measuring angular velocity.

At step 220, the drone can be used to generate measurement data indicative of the angular velocity when the drone is within a rotating shell.

In some embodiments, the measurement data can be stored on a data storage medium when the drone is within the rotating shell at step 230. In some embodiments, the measurement data can be transmitted when the drone is within the rotating shell at step 240. In some embodiments, the measurement data can both, be stored on a data storage medium and transmitted when the drone is within the rotating shell.

At step 250, the measurement data can be processed at at least one processor to determine a position of the drone within the rotating shell.

Figure 9:
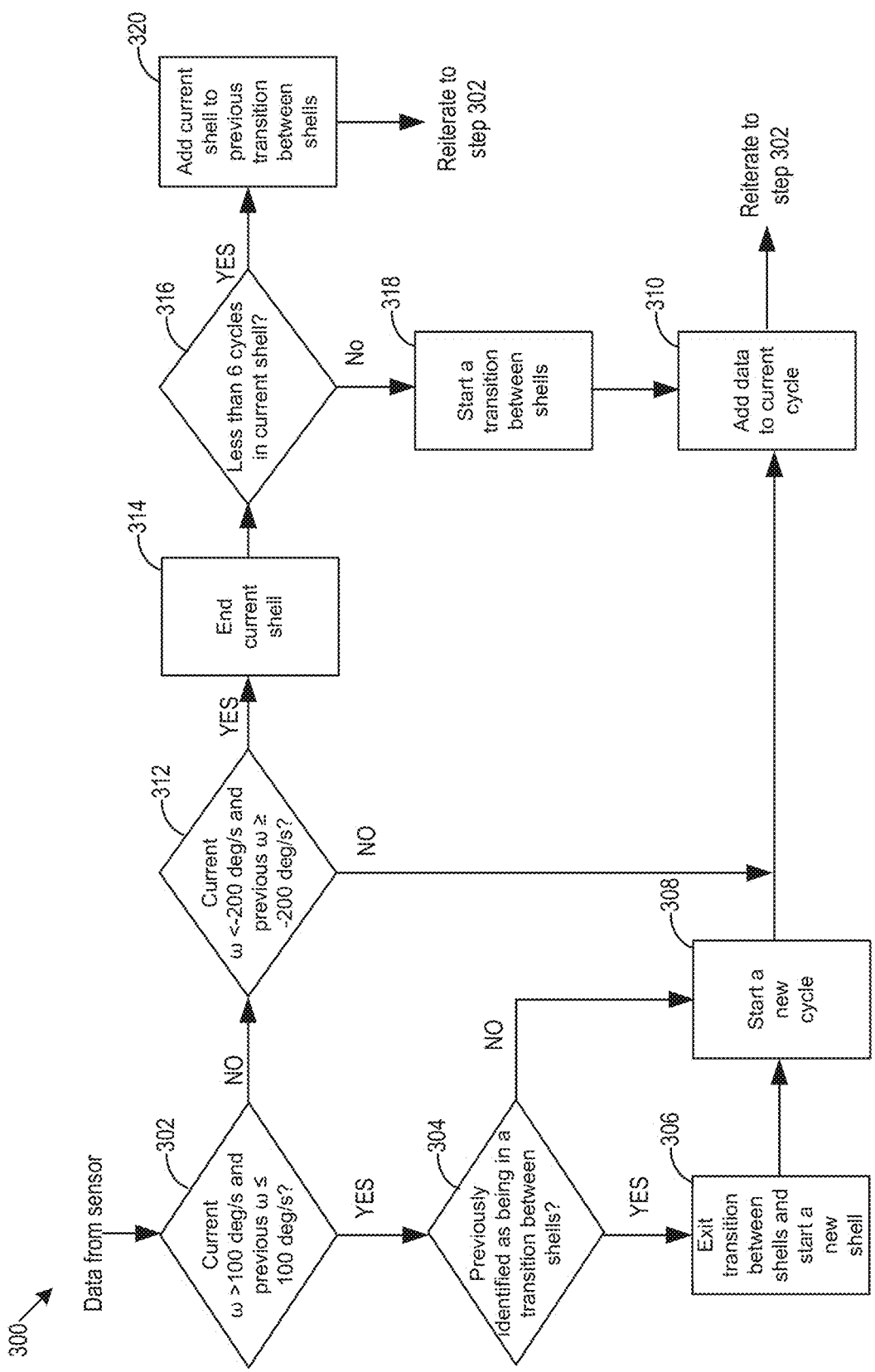
FIG. 9 is a flowchart diagram illustrating the steps of determining a position of the receptacle within a rotating shell based on the angular velocity, according to one embodiment.

Referring now to FIG. 9, shown therein is a flowchart diagram illustrating the steps of a method 300 for determining a position of the receptacle within one or more rotating shells based on the angular velocity, according to one embodiment. For the purposes of this description, flags are used to describe the tracking of transitions, shells, and cycles. However, it will be understood that any appropriate parameters can be used to track whether the receptacle 10. For example, instead of a flag that is successively set and reset, time instants can be used to identify when the receptacle 10 began a transition, shell, or cycle.

Having the measurement data including angular velocity ($\omega$), the method 300 can begin at step 302. At step 302, the angular velocity at a current time instant (i), herein referred to as "current angular velocity" ($\omega_i$) and the angular velocity at a previous time instant, herein referred to as "previous angular velocity" ($\omega_{i-1}$) can be analyzed. In particular, the current angular velocity ($\omega_i$) and the previous angular velocity ($\omega_{i-1}$) can be compared with a pre-determined angular velocity threshold indicative of a receptacle 10 travelling in a new rotation cycle of the rotating shell, herein referred to as the "pre-determined angular velocity indicative of a new cycle", as shown, for example in FIG. 10. The pre-determined angular velocity indicative of a new cycle can be any appropriate value. The pre-determined angular velocity indicative of a new cycle can be based on the rotational speed of the rotating shell. For example, the pre-determined angular velocity indicative of a new cycle can be about 100 degrees per second (deg/s). In some embodiments having more than one rotating shell, the pre-determined angular velocity indicative of a new cycle can be the same value for each of the more than one rotating shells. In some embodiments, the pre-determined angular velocity indicative of a new cycle can be specific to a particular rotating shell.

If the current angular velocity ($\omega_i$) is greater than the pre-determined angular velocity indicative of a new cycle, and if the previous angular velocity ($\omega_{i-1}$) is less than or equal to the pre-determined angular velocity indicative of a new cycle, then the method 300 can proceed to step 304. Step 304 can involve determining whether the receptacle 10 has already been identified as being in a transition between rotating shells, or a shell transfer stage. Determining whether the receptacle 10 has already been identified as being in a transition can involve determining whether a flag has been set to indicate that all subsequent measurement data relates to the receptacle 10 being in a transition.

If, at step 304, the receptacle 10 has already been identified as being in a transition, the method 300 can proceed to step 306. At step 306, another flag can be set to indicate that the receptacle 10 has entered a new shell. Once the receptacle 10 is identified as having entered a new shell, the method 300 can proceed to step 308. At step 308, another flag can be set to indicate that the receptacle 10 has started a new cycle. Furthermore, it may be noted that completion of step 306 automatically leads to step 306, that is, by starting a new shell, the receptacle 10 also starts a new cycle in the new shell.

If at step 304, the receptacle 10 has not already been identified as being in a transition, the method 300 can proceed to step 308. At step 308, another flag can be set to indicate that the receptacle 10 has started a new cycle. It will be understood that by setting a flag to start a new cycle, the flag for the previous cycle is also reset to indicate that the previous cycle has ended.

After step 308, the method 300 can proceed to step 310. At step 310, the measurement data can be added to the current cycle and the method 300 can reiterate to step 302.

If at step 302, the current angular velocity ($\omega_i$) is greater than the pre-determined angular velocity indicative of a new cycle or if the previous angular velocity ($\omega_{i-1}$) was greater than the pre-determined angular velocity indicative of a new cycle, the method 300 can proceed to step 312.

At step 312, the current angular velocity ($\omega_i$) and the previous angular velocity ($\omega_{i-1}$) can be analyzed again, but this time, they are compared with a pre-determined angular velocity threshold indicative of a receptacle 10 travelling within a transition between rotating shells, herein referred to as the "pre-determined angular velocity indicative of a transition". The pre-determined angular velocity indicative of a transition, or a shell transfer stage, can be any appropriate value. For example, the shell transfer stage can include a conveyor belt for transferring a receptacle 10 from a first shell to a second shell. The pre-determined angular velocity indicative of a transition can be based on the speed of the conveyor belt. For example, the pre-determined angular velocity indicative of a transition can be about 200 deg/s. In some embodiments having more than one shell transfer stages, the pre-determined angular velocity indicative of a transition can be the same value for each of the more than one shell transfer stages. In some embodiments, the pre-determined angular velocity indicative of a transition can be specific to a shell transfer stage.

If the current angular velocity ($\omega_i$) is greater than the pre-determined angular velocity threshold indicative of a transition, or if the previous angular velocity ($\omega_{i-1}$) is less than the pre-determined angular velocity threshold indicative of a transition, then the method 300 can proceed to step 310. At step 310, the measurement data can be added to the current cycle and the method 300 can reiterate to step 302.

However, at step 312, if the current angular velocity ($\omega_i$) is less than the pre-determined angular velocity threshold indicative of a transition, and if the previous angular velocity ($\omega_{i-1}$) is greater than or equal to the pre-determined angular velocity threshold indicative of a transition, then the method 300 can proceed to step 314. At this point the analysis of the angular velocities may indicate that the receptacle 10 has entered a transition between two shells (i.e. the receptacle 10 having exited a shell). At step 314, the flag indicative of a new shell can be reset. That is, a flag that was previously set to indicate that the receptacle 10 has entered a new shell can be reset to indicate that the receptacle 10 has exited the shell. After step 314, the method 300 can proceed to step 316.

It should be noted that the pre-determined angular velocity threshold indicative of a new cycle and the pre-determined angular velocity indicative of a transition typically have opposite polarities. For example, a receptacle 10 can rotate in a rotating shell in a first direction, such as counterclockwise, or in a positive polarity. When the receptacle 10 moves into a shell transfer stage, the receptacle 10 can continue to rotate, but in a direction that is opposite to the direction of rotation when the receptacle was in a rotating shell, such as clockwise, or in a negative polarity. As shown in FIG. 9, the pre-determined angular velocity threshold indicative of a new cycle is +100 deg/s and the pre-determined angular velocity threshold indicative of a transition is −200 deg/s.

Furthermore, the receptacle 10 can be placed in the rotating shell in an opposite orientation. To determine whether the receptacle 10 is placed in the rotating shell in an opposite direction, the method 300 can involve determining an orientation of the receptacle 10 based on the angular velocity of the receptacle 10 over a sample time duration.

If the receptacle 10 is placed in the rotating shell in an opposite orientation, the method 300 shown in FIG. 9 can be adjusted to accommodate the opposite orientation. That is, the polarities of the pre-determined angular velocity threshold indicative of a new cycle and the pre-determined angular velocity indicative of a transition can be reversed. For example, the comparison at step 302 would involve determining if the current angular velocity ($\omega_i$) is less than −100 deg/s, and if the previous angular velocity ($\omega_{i-1}$) is greater than or equal to −100 deg/s. If so, the method 300 could proceed to step 304.

Referring still to FIG. 9, at step 316, the number of cycles in the current shell, that is the shell that the receptacle 10 has just exited, can be analyzed. In particular, the number of cycles in the current shell can be compared with a pre-determined minimum number of cycles for that shell, herein referred to as a "pre-determined rotation cycle threshold". As the receptacle 10 passes through a shell transfer stage, it can have an angular velocity that is similar to the angular velocity experienced as the receptacle 10 is rotated through a cycle in a rotating shell. To distinguish between rotations experienced in the shell transfer stage, and rotations experienced in a rotating shell, the total number of cycles that the receptacle 10 completed in the current shell can be analyzed. As set out above, an article can undergo approximately thirty (30) to fifty (50) cycles in a single rotating shell before moving onto the next rotating shell. The pre-determined rotation cycle threshold can be any appropriate number. For example, the pre-determined rotation cycle threshold can be about five (5) or six (6). The pre-determined rotation cycle threshold can be a same value for all shells in the packaging line, or it can be specific to a single shell in the packaging line.

If the number of cycles in the current shell is less than the pre-determined rotation cycle threshold for that shell, the method 300 can proceed to step 320. At step 320, the current shell can be identified as being a part of the previous transition between shells. That is, the current shell was actually a shell transfer stage and the method 300 can reiterate to step 302.

If the number of cycles in the current shell are greater than or equal to the pre-determined rotation cycle threshold for that shell, the end of the current shell, as identified at step 314, can be recognized as being a true shell (e.g., not a shell transfer stage) and the method can proceed to step 318. At step 318, the flag for a new transition can be set. After step 318, the method 300 can proceed to step 310. At step 310, the measurement data is added to the current cycle and the method 300 can reiterate to step 302.

Figure 10:
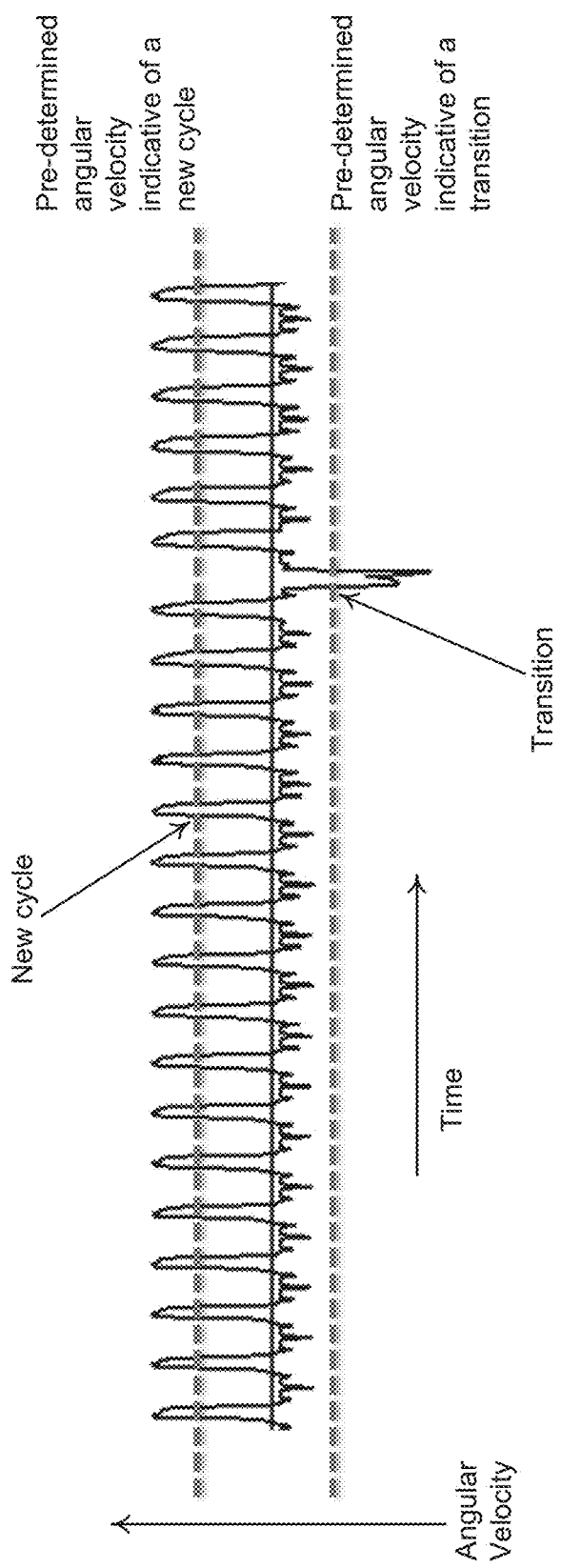
FIG. 10 is a graph illustrating angular velocity of the receptacle within one or more rotating shells, according to one embodiment.

Referring now to FIG. 10, shown therein is a graph illustrating angular velocity of the receptacle within one or more rotating shells, according to one embodiment. As shown in FIG. 10, new cycles can be identified when the angular velocity is greater than the pre-determined angular velocity threshold indicative of a new cycle. A transition can be identified when the angular velocity is less than the pre-determined angular velocity threshold indicative of a transition. Furthermore, the pre-determined angular velocity threshold indicative of a new cycle has an opposite polarity than the pre-determined angular velocity threshold indicative of a transition.

In some embodiments, the position of the receptacle 10 within one or more rotating shells may be determined based on accelerometer readings and elapsed time calculations. In some instances the receptacle 10 can move within a shell at a known speed or a known translational velocity. The distance travelled within a rotating shell relative to a reference point such as the receptacle's point of entry into the rotating shell can be determined. Accelerometer readouts can be analyzed to determine whether the receptacle 10 has entered a shell. For example, acceleration readouts of the receptacle 10 entering a shell may correspond to a particular impact pattern which may be determined a priori. Thus, during use, if the same or similar pattern of impacts experienced by the receptacle 10 is detected, then it may be concluded that the receptacle 10 is being deposited into a rotating shell and the time of this event may be recorded. The receptacle's position may therefore be calculated based on the time that has elapsed since time of the receptacle's entry into the rotating shell.

In some other embodiments, the use of elapsed time measurements and accelerometer readings may also be used to identify potential or existing damage located at various locations within a rotating shell as a result of factors such as wear and tear. The receptacle 10 may be subjected to additional forces due to damage or irregularities found in the rotating shell. These forces, which may not be characteristic of the receptacle 10 entering a rotating shell, can similarly be detected by the accelerometers. As a result, the time elapsed between entry of the receptacle 10 into the rotating shell and detection of these forces can be used to determine the location of possible damage within the rotating shell.

Numerous specific details are set forth herein in order to provide a thorough understanding of the exemplary embodiments described herein. However, it will be understood by those of ordinary skill in the art that these embodiments may be practiced without these specific details. In other instances, well-known methods, procedures and components have not been described in detail so as not to obscure the description of the embodiments. Furthermore, this description is not to be considered as limiting the scope of these embodiments in any way, but rather as merely describing the implementation of these various embodiments.

The invention claimed is:

1. A method for processing an object within a manufacturing line, the manufacturing line having at least one rotating shell, the method comprising:
   providing a device, the device being substantially similar in form to the object being processed within the manufacturing line, the device comprising at least one sensor, the at least one sensor comprising a gyroscope for measuring angular velocity of the device over a duration of time, wherein the gyroscope comprises a microelectromechanical system (MEMS) gyroscope;

generating, based on the at least one sensor, measurement data indicative of the angular velocity when the device is within the at least one rotating shell; and processing the measurement data by at least one processor to determine a position of the device within the rotating shell based on the angular velocity.

2. The method of claim 1, wherein the processing the measurement data comprises comparing the angular velocity to a first pre-determined angular velocity threshold, the first pre-determined angular velocity threshold being indicative of the device travelling in a new rotation cycle of the at least one rotating shell.

3. The method of claim 2, wherein a magnitude of the first pre-determined angular velocity threshold is about 100 degrees per second.

4. The method of claim 2, wherein:
the processing the measurement data further comprises determining an orientation of the device based on the angular velocity; and
a polarity of the first pre-determined angular velocity threshold is selected based on the orientation.

5. The method of claim 4, wherein the processing the measurement data further comprises determining tilt and rotation of the device based on the orientation.

6. The method of claim 1, wherein:
the at least one rotating shell comprises a plurality of rotating shells;
the plurality of rotating shells comprise a shell transfer stage between adjacent rotating shells; and
the processing the measurement data further comprises determining a position of the device amongst the plurality of rotating shells based on the angular velocity.

7. The method of claim 6, wherein the determining a position of the device amongst the plurality of rotating shells based on the angular velocity further comprises comparing the angular velocity to a second pre-determined angular velocity threshold, the second pre-determined angular velocity threshold being indicative of the device travelling within the shell transfer stage.

8. The method of claim 6, wherein the determining a position of the device amongst the plurality of rotating shells based on the angular velocity further comprises comparing the angular velocity over the duration of time to the first pre-determined angular velocity threshold and a pre-determined rotation cycle threshold, the pre-determined rotation cycle threshold being indicative of the device travelling within the shell transfer stage.

9. The method of claim 6, wherein:
the at least one sensor further comprises at least one accelerometer for measuring acceleration of the device over the duration of time;
the measurement data being further indicative of the acceleration;
the processing the measurement data further comprises:
determining shock of the device within the at least one rotating shell based on the acceleration; and
correlating the shock to the position over the duration of time.

10. The method of claim 6, wherein the method further comprises storing the measurement data on a data storage medium coupled to the at least one processor.

11. A system for processing an object within a manufacturing line, the manufacturing line having at least one rotating shell, the system comprising:
a device movable in the manufacturing line, the device being substantially similar in form to the object being processed within the manufacturing line;
at least one sensor, the at least one sensor comprises a gyroscope for measuring angular velocity of the device over a duration of time and generating measurement data indicative of the angular velocity over the duration of time, the at least one sensor being coupled to the device in a fixed spatial relationship, wherein the gyroscope comprises a microelectromechanical system (MEMS) gyroscope; and
at least one processor configured for processing the measurement data, wherein the processing the measurement data comprises determining a position of the device within the at least one rotating shell based on the angular velocity.

12. The system of claim 11, wherein the device is a receptacle defining an interior storage chamber, and wherein the at least one sensor is contained within the interior storage chamber.

13. A system for processing an object within a manufacturing line, the manufacturing line having at least one rotating shell, the system comprising:
a device movable in the manufacturing line, the device being substantially similar in form to the object being processed within the manufacturing line;
at least one sensor, the at least one sensor comprises a gyroscope for measuring angular velocity of the device over a duration of time and generating measurement data indicative of the angular velocity over the duration of time, the at least one sensor being coupled to the device in a fixed spatial relationship; and
at least one processor configured for processing the measurement data, wherein the processing the measurement data comprises determining a position of the device within the at least one rotating shell based on the angular velocity
wherein the device comprises:
a receptacle defining an interior storage chamber; and
a core shaped to fit within the interior storage chamber, the core being removable from the interior storage chamber, and the interior storage chamber and the core being shaped to be mateable with one another for maintaining a fixed spatial relationship between the core and the interior storage chamber, the at least one sensor being coupled to the core.

14. The system of claim 11, wherein the determining a position of the device within the at least one rotating shell based on the angular velocity comprises comparing the angular velocity to a first pre-determined angular velocity threshold, the first pre-determined angular velocity threshold being indicative of the device travelling in a new rotation cycle of the at least one rotating shell.

15. The system of claim 11, wherein:
the processing the measurement data further comprises determining an orientation of the device based on the angular velocity; and
a polarity of the first pre-determined angular velocity threshold being based on the orientation.

16. The system of claim 11, wherein:
the at least one rotating shell comprises a plurality of rotating shells, adjacent rotating shells having a shell transfer stage between the respective rotating shells; and
the processing the measurement data further comprises determining a position of the device amongst the plurality of rotating shells based on the angular velocity, wherein the determining a position of the device amongst the plurality of rotating shells based on the angular velocity comprises comparing the angular velocity to a second pre-determined angular velocity threshold, the second pre-determined angular velocity threshold being indicative of the device travelling within the shell transfer stage.

17. The system of claim 11, further comprising:
a transmitter coupled to the at least one sensor for transmitting the measurement data in real-time when the device is within the at least one rotating shell; and
a receiver coupled to the at least one processor for receiving the measurement data when the device is within the at least one rotating shell.

18. The system of claim 17, further comprising one or more repeaters mounted on the at least one rotating shell for receiving the measurement data from the transmitter and for transmitting the measurement data to the receiver.

19. The system of claim 13, wherein the interior storage chamber and the core being shaped to be mateable with one another comprises at least one of:
the interior storage chamber having a protrusion and the core having a corresponding groove to accommodate the protrusion of the interior storage chamber; and
the core having a protrusion and the interior storage chamber having a corresponding groove to accommodate the protrusion of the core.

20. The system of claim 19, wherein the device further comprises a cap and a tool, the cap being configured to close an opening of the receptacle, the cap being removably attachable to the opening, an outer surface of the cap comprising at least one seat, and wherein the system further comprises a tool for attaching and removing the cap to and from the device, the tool having at least one member for engaging the at least one seat to hold the cap.

* * * * *